United States Patent
Olsson (10) Patent No.: US 9,106,982 B2
(45) Date of Patent: Aug. 11, 2015

(54) OPTICAL-ELECTRICAL SWITCHING NODE

(75) Inventor: Bengt-Erik Olsson, Hovas (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 209 days.

(21) Appl. No.: 13/818,631

(22) PCT Filed: Aug. 25, 2010

(86) PCT No.: PCT/EP2010/005203
§ 371 (c)(1),
(2), (4) Date: Feb. 22, 2013

(87) PCT Pub. No.: WO2012/025133
PCT Pub. Date: Mar. 1, 2012

(65) Prior Publication Data
US 2013/0156429 A1 Jun. 20, 2013

(51) Int. Cl.
*H04J 14/00* (2006.01)
*H04Q 11/00* (2006.01)

(52) U.S. Cl.
CPC ... *H04Q 11/0005* (2013.01); *H04Q 2011/0007* (2013.01); *H04Q 2011/0035* (2013.01)

(58) Field of Classification Search
CPC .............. H04Q 11/0005; H04Q 2011/0007; H04Q 2011/0035
USPC ........................................................ 398/49
See application file for complete search history.

(56) References Cited

U.S. PATENT DOCUMENTS 5,438,445 A * 8/1995 Nakano ........................... 398/83
5,461,504 A * 10/1995 Johnson et al. ................ 398/139
(Continued)

FOREIGN PATENT DOCUMENTS

| EP | 1 231 811 A2 | 8/2002 |
| EP | 1 250 024 A2 | 8/2002 |

OTHER PUBLICATIONS

Stephen B. Alexander et al, "A Precompetitive Consortium on Wide-Band All-Optical Networks"; Jun. 1993; Journal of Lightwave Technology, vol. 11, No. 5/6, May/Jun. 1993.*

*Primary Examiner* — Ken Vanderpuye
*Assistant Examiner* — Abbas H Alagheband
(74) *Attorney, Agent, or Firm* — Rothwell, Figg, Ernst & Manbeck, P.C.

(57) ABSTRACT

An electro-optical switch (170) for receiving N data streams optically, each of said N data streams having an amplitude and a phase and each being located at an optical center frequency $F_{O1}+RF_M$, where $F_{O1}$ is a first optical modulation frequency and $RF_M$ is a signal center frequency. The electro-optical switch is arranged to convert the N data streams to electrical data signals at the data stream's signal center frequency $RF_M$, the electrical data signals having the amplitude and phase of the optical data stream. The electro-optical switch is further arranged to convert electrical data signals to optical output signals at optical center frequency $F_{O2}+RF_{Out}$ with the amplitude and phase of the first electrical data signal maintained, and to transmit the optical output signals, with $RF_M$ and $RF_{Out}$ being equal to or different from each other, and $F_{O1}$ and $F_{O2}$ also being equal to or different from each other.

10 Claims, 5 Drawing Sheets

(56) References Cited

U.S. PATENT DOCUMENTS

| | | | |
|---|---|---|---|
| 6,427,033 B1* | 7/2002 | Hait | 385/11 |
| 6,477,287 B1* | 11/2002 | Hait | 385/15 |
| 7,197,213 B2* | 3/2007 | Graves | 385/52 |
| 8,611,751 B2* | 12/2013 | Liu et al. | 398/98 |
| 2002/0012143 A1* | 1/2002 | Graves et al. | 359/128 |
| 2002/0105632 A1* | 8/2002 | Holton | 356/28.5 |
| 2002/0105965 A1* | 8/2002 | Dravida et al. | 370/463 |
| 2002/0109879 A1* | 8/2002 | Wing So | 359/118 |
| 2004/0151421 A1* | 8/2004 | Yasue et al. | 385/16 |
| 2006/0051013 A1* | 3/2006 | Graves | 385/16 |
| 2008/0025733 A1* | 1/2008 | Nazarathy et al. | 398/209 |
| 2009/0208209 A1* | 8/2009 | Ng et al. | 398/49 |
| 2010/0021166 A1* | 1/2010 | Way | 398/79 |
| 2011/0217040 A1* | 9/2011 | Mori | 398/53 |
| 2012/0106975 A1* | 5/2012 | Olsson | 398/147 |
| 2013/0022362 A1* | 1/2013 | Olsson et al. | 398/141 |
| 2013/0259490 A1* | 10/2013 | Malouin et al. | 398/152 |

\* cited by examiner

OPTICAL-ELECTRICAL SWITCHING NODE

CROSS REFERENCE TO RELATED APPLICATION(S)

This application is a 35 U.S.C. §371 National Phase Application from PCT/EP2010/005203, filed Aug. 25, 2010, designating the United States, the disclosure of which is incorporated herein in its entirety by reference.

TECHNICAL FIELD

The present invention discloses an electro-optical switching node.

BACKGROUND

Traditionally, optical networks have comprised multiple point-to point links with little or no intelligence on the optical side. All routing functions in such networks have been carried out on the (digital) electronic side after conversion of the optical signals into digital data in each node in the network.

In the network nodes in a traditional network with optical transfer of data, the optical signals are converted into corresponding data streams where the address information is read and an electronic switch fabric is used to send the data to an output port suitable for its final destination. When the bit-rate increases in the optical channels, this electronic routing technique becomes time and power consuming. Since most data passes through the node en route to further optical nodes, it is necessary to collect data that is to be transmitted 20 through essentially the same optical links and to add some kind of routing label in order to simplify electronic routing in intermediate nodes.

An example of such a system is the so called multi protocol label switching, MPLS, where a central control system manages virtual data paths in the network. With the advent in the late 1990's of dense wavelength division multiplexing, DWDM, where multiple optical wavelengths are transmitted in the same fiber in order to increase the total capacity of the optical point-to-point link, it became natural to also consider using wavelengths to create dynamic optical paths. Thus, some wavelengths could transmit data from node A to node B while some wavelengths could continue to node C without having to be converted into electronic data and inspected in node B. This concept fundamentally decreased the electronic processing requirements and power dissipation in node B. However, the concept required more advanced optical components that could drop a specific optical DWDM channel, and preferably also insert a new channel on the empty wavelength slot. These components are called reconfigurable optical add-drop multiplexers, ROADM, and are based on advanced optical filtering technology and are today to varying extent used in modern optical networks.

The use of ROADMs has increased the flexibility of optical networks, but the cost of ROADM components still hampers large scale use, and today most networks only contain a handful of ROADMs. Another advantage with ROADMs is that their operation is inherently independent of the modulation format of the routed data signals and can thus handle complex modulation formats e.g. QPSK and 16-QAM. Conventional electronic routing schemes can usually not operate independent of optical modulation formats since they need to work on binary data.

SUMMARY

It is an object of the present invention to offer a solution to electro-optical switching which obviates at least some of the disadvantages of previous technology.

Such a solution is offered by the present invention in that it discloses an electro-optical switch which is arranged to receive N data streams on an optical link from a first other node in a communications system, where each of the N data streams has an amplitude and a phase and each is located at an optical centre frequency $F_{O1}+RF_m$, where $Fo_1$ is a first optical modulation frequency and $RF_M$ is a signal centre frequency, where M is an integer which ranges from 1 to N for the N data streams. Thus, the data stream with the lowest optical centre frequency, i.e. the first data stream frequency-wise, will have the optical centre frequency $FO_1+RF_1$, data stream "number 2" frequency-wise will have the optical centre frequency $FO_1+RF_2$, etc, up to data stream N, which will have the optical centre frequency $FO_1+RF_N$.

The electro-optical switch is arranged to convert at least a first of the N data streams on the optical link to a first electrical data signal at the data stream's signal centre frequency $RF_M$, (i.e. $RF_1$ for data stream 1, $RF_2$ for data stream 2 etc) with the first electrical data signal having the amplitude and phase of the first data stream on the optical link. The electro-optical switch is further arranged to convert the first electrical data signal to a first optical output signal at an optical centre frequency $F_{O2}+RF_{out}$ with the amplitude and phase of the first electrical data signal maintained, where $F_{O2}$ is a second optical modulation frequency, and to forward the first optical output signal to a second other node in the communications system, with $RF_M$ and $RF_{OUT}$ being equal to or different from each other, and $F_{O1}$ and $F_{O2}$ also being equal to or different from each other.

Thus, by means of the invention, an electro-optical switch is disclosed which can switch the signal centre frequency of a data stream which is received as an optical data stream, with the switching of the signal centre frequency being done in the electrical domain.

In one embodiment, the electro-optical switch comprises a control unit for checking which optical frequencies which are available for transmissions to the second other node, and for causing the switching node to choose $RF_{OUT}$ to be equal to one of those available frequencies.

In one embodiment, the electro-optical switch is arranged to transmit data signals to local users, so that one or more of the N data streams which are converted to electrical data signals can be transmitted to a local user.

In one embodiment, the electro-optical switch is arranged to receive a data signal from a local user, and to convert such a data signal to an optical output signal at a centre frequency $RF_{out}$ with the amplitude and phase of the electrical data signal maintained, and to forward the optical output signal to the second other node in the communications system. In one such embodiment, the electro-optical switch is arranged to transmit/receive data signals to/from a local user as a baseband signal. In another such embodiment, the electro-optical switch is arranged to transmit/receive the data signals to/from a local user as an electrical signal on a Radio Frequency, with an amplitude and a phase.

BRIEF DESCRIPTION OF THE DRAWINGS

The invention will be described in more detail in the following, with reference to the appended drawings, in which.

DETAILED DESCRIPTION

Figure 1:
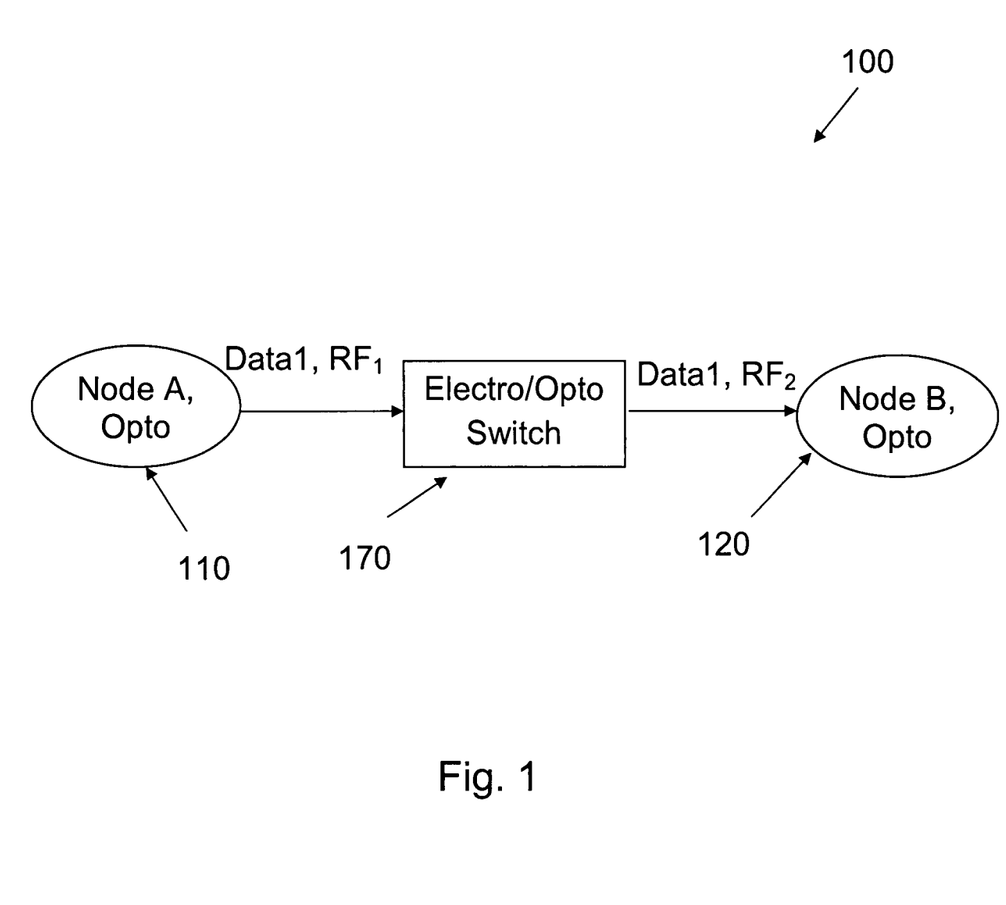
FIGS. 1-4 show different embodiments of the invention.

FIG. 1 shows an overview of a communications system 100 in which an embodiment of an electro-optical switch 170 of the invention is used. As indicated in FIG. 1, the electro-optical switch 170 is arranged to receive a data stream, "Data 1", from another node 110, shown as "Node A" in FIG. 1, on an optical link. In other words, the node denoted as 110 in FIG. 1, is a node which transmits data optically. The data stream Data 1 which is received from the node 110 is transmitted optically at a signal centre frequency which here is designated as $RF_1$, and has a bandwidth B. The data stream Data 1 is modulated by an optical signal at frequency $F_O$ in order to be able to be transported on the optical link between Node A and the electro-optical switch 170, so that Data 1 is received on an optical centre frequency which can be denoted as $F_O+RF_1$. This is a principle which is valid for the embodiments described in the following as well: Data stream N is received at an optical frequency $F_O+RF_N$, where $F_O$ is an optical modulation frequency, and $RF_N$ is a signal centre frequency. However, the optical modulation signal $F_O$ is not shown in FIG. 1, nor in the other figures; what is shown is only the signal centre frequency $RF_N$, a principle which is used in the figures both for received and transmitted signals The electro-optical switch 170 of the invention is arranged to convert the optically received data stream Data 1 from the node 110 to an electrical 15 signal, while still retaining the signal centre frequency RF1. In other words, an electrical signal bearing the data of Data 1 is created with a signal centre frequency $RF_1$ in the electro-optical switch 170. In addition, the electro-optical switch 170 is arranged to convert the electrical data signal which is created from the optical data signal Data 1 into an optical output signal bearing the data denoted as Data 1, where the optical output signal has an optical centre frequency $F_O+RF_2$, where $RF_2$ is a second signal centre frequency which can either be equal to or different from $RF_1$. In addition, in one embodiment, the optical output signal is given an optical centre frequency $F_{O2}+RF_2$; in other words, in such an embodiment, a different optical frequency is used when creating the output signal.

In addition, the amplitude and the phase of the optical signal from the first node 110 are retained throughout. In other words, both the electrical signal to which the input optical data stream is converted and the output optical signal retain the amplitude and phase of the optically input data stream.

Since $RF_2$ can either be equal to or different from $RF_1$, the electro-optical switch 170 can also be seen as being arranged to "move" the signal centre frequency of an input optical data stream before retransmitting it optically.

Figure 2:
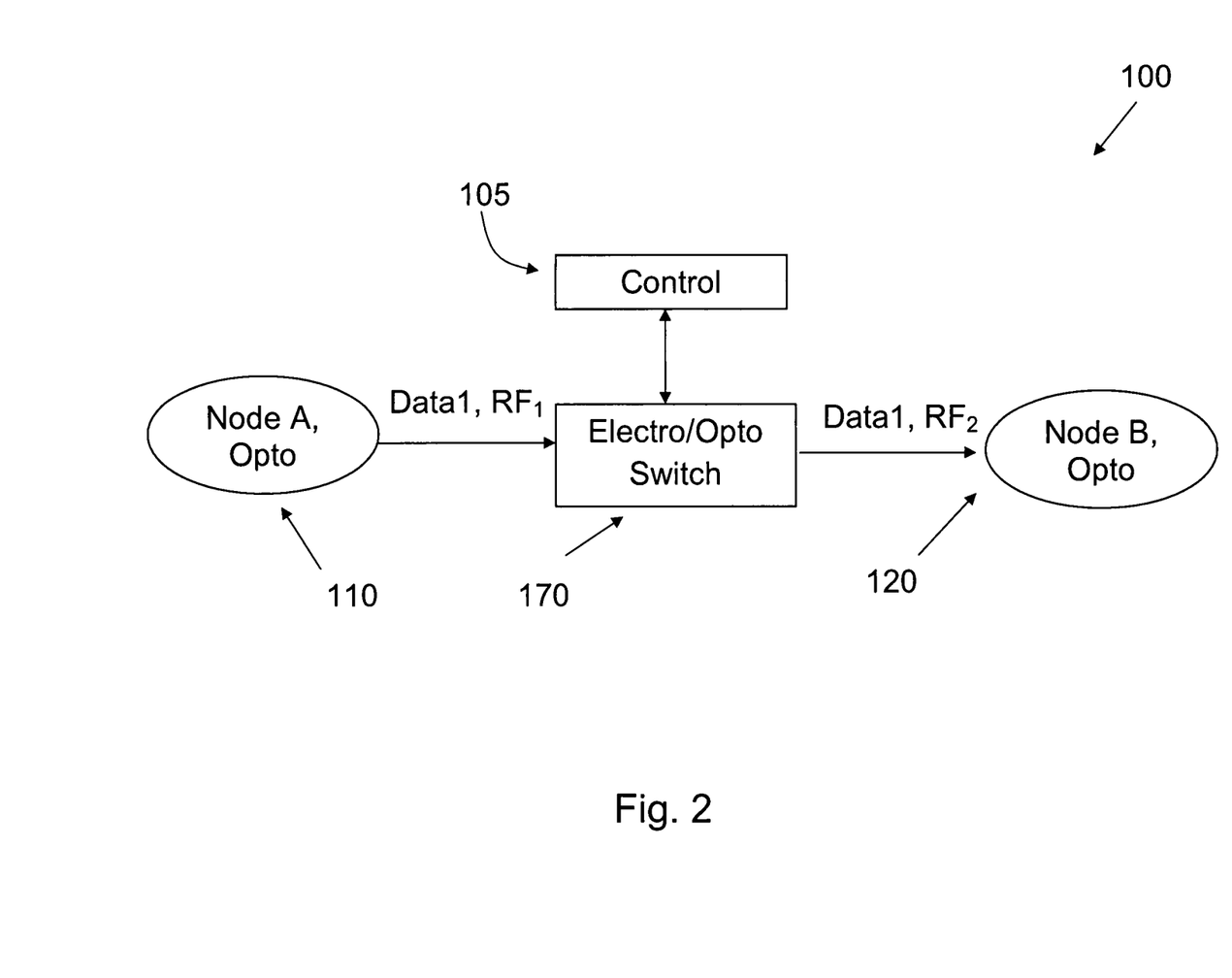

FIG. 2 shows a second embodiment of an electro-optical switch 170 of the invention. In this embodiment, the electro-optical switch 170 also comprises a control unit 105, which is arranged to control the "retransmission" frequency $F_O+RF_2$ on which the signal bearing Data 1 is transmitted to the second optical node 120. In one embodiment the control unit 105 is arranged to check which optical frequencies which are available for transmissions to the second other node 120, and for causing the switching node 170 to choose $F_O+RF_2$ to be equal to one of those available frequencies, suitably by influencing which frequency that is chosen as $RF_2$.

Figure 3:
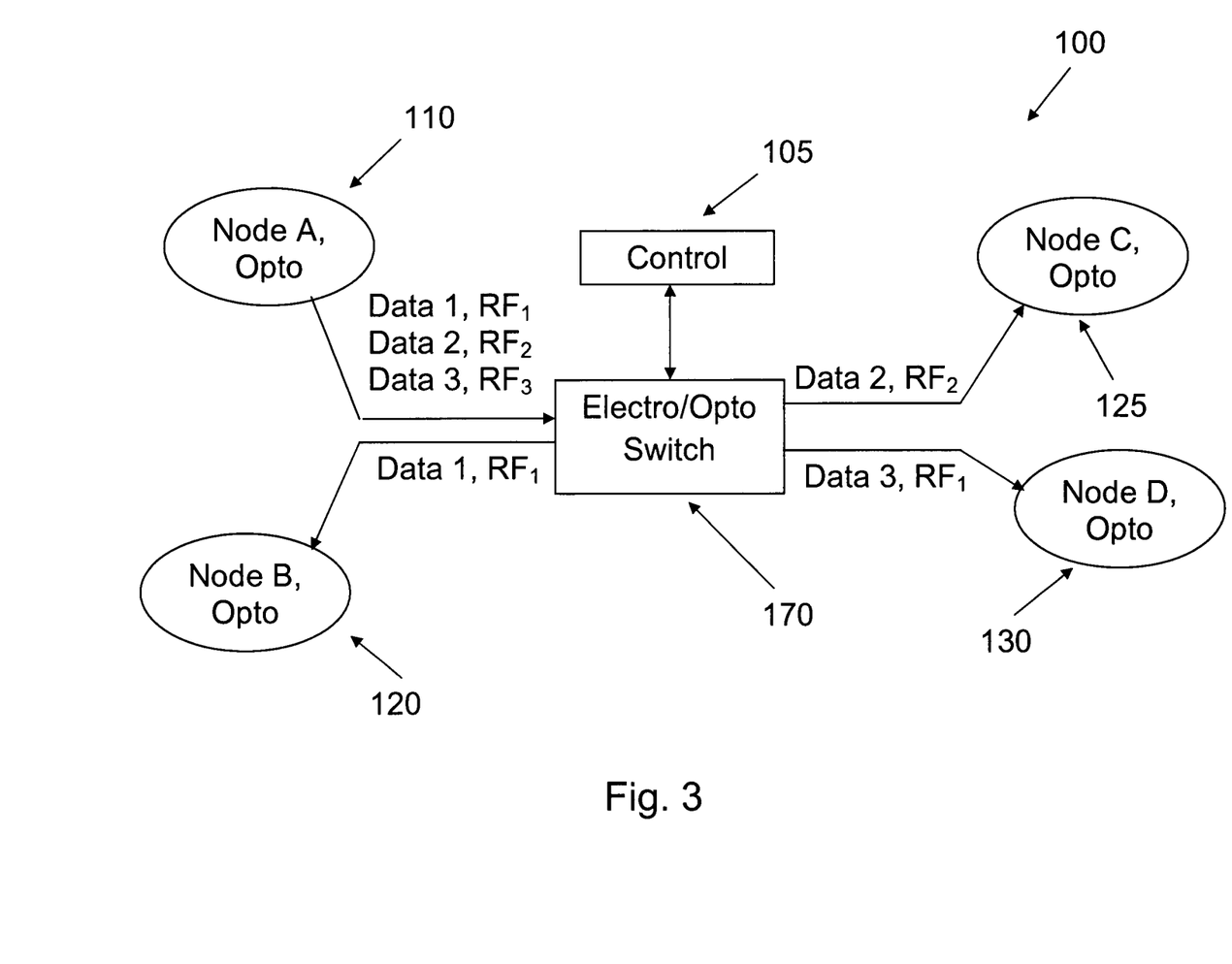

FIG. 3 shows the embodiment of FIG. 2, but in a slightly different system constellation, in order to further illustrate the function of the electro-optical switch 170: in FIG. 2, the electro-optical switch 170 is shown as being connected via optical links to four nodes, nodes A-D, shown as 110, 120, 130 and 140 in FIG. 1. From the node 110, "Node A", the electro-optical switch 170 receives three data streams on an optical link, Data 1, Data 2 and Data 3, each on respective signal centre frequencies $RF_1$, $RF_2$ and $RF_3$, suitably all with the same bandwidth B, although the received data streams can also have differing bandwidths. Optically these three data streams are thus received as $F_O+RF_{1-3}$.

The three data streams Data 1, Data 2 and Data 3 from node A are destined for the different nodes in the system as follows:

| Data Stream | Destination Node |
|---|---|
| 1 | Node B |
| 2 | Node C |
| 3 | Node B |

The electro-optical switch 170 converts the optically received data streams Data 1-3 from the node 110 to three corresponding electrical signals which retain their respective signal centre frequencies $RF_1$, $RF_2$ and $RF_3$. Thus, three electrical signals, each bearing one of the data streams of Data 1, Data 2 and Data 3 are created at the signal centre frequencies $RF_1$-$RF_3$ in the electro-optical switch 170.

The control unit 105 here has as one of its functions to check which optical frequencies that are available for transmissions from the electro-optical switch 170 to the "destination" nodes, i.e. nodes B, C and D, and also to cause the electro-optical switch 170 to choose optical output (centre) frequencies to the destination nodes among the available optical frequencies. As an alternative to the control unit 105 checking which optical frequencies that are available for transmissions from the electro-optical switch 170 to the "destination" nodes, the control unit can comprise or be connected to a network planning unit which already in advance has planned which frequencies that should be used for transmission to the "destination nodes".

In the example shown in FIG. 3, frequency $F_O+RF_1$ is available for optical transmissions to Node B, and $F_O+RF_2$ is available for optical transmissions to Node C. Thus, the optical data streams which are to be transmitted from the electro-optical switch 170 can be transmitted on the same optical centre frequencies as they were received on. However, in the case of node D, the frequency $F_O+RF_3$ on which the data stream Data 3 intended for that node is unavailable. The control unit 105 notices that another optical frequency, in the current example $F_O+RF_1$, is available for transmissions to that node, and accordingly the control unit 105 controls the electro-optical switch 170 to create an optical signal bearing data D3 on frequency $F_O+RF_1$, destined for Node D.

In conclusion, in the example of FIG. 3, three data streams Data 1-3 are received optically by the electro-optical switch 170 from Node A on respective optical centre frequencies $F_O+RF_1$, $F_O+RF_2$ and $F_O+RF_3$, the data streams being destined for, respectively, Node B, Node C and Node D. The electro-optical switch 170 converts the three data streams to corresponding electrical data signals with retained centre frequencies $RF_1$, $RF_2$ and $RF_3$, whilst retaining in the electrical data signals the amplitude and phase of the corresponding data stream on the optical link.

In addition, the electro-optical switch 170 converts the three electrical data signals to a corresponding optical output signal at respective centre frequencies $F_O+RF_1$ (Data 1, to Node B), $F_O+RF_2$ (Data 2, to Node C) and $F_O+RF_1$ (Data 3 to Node D), as explained above, with the amplitude and phase of the electrical data signals maintained, and forwards those optical output signals to nodes B, C and D. As has emerged, in the case of two of the received and retransmitted data streams, Data 1 and Data 2, the input and output optical centre frequencies are the same, whilst in the case of Data 3, the output optical centre frequency $RF_1$ has been "shifted" with respect to the input optical frequency $F_O+RF_3$. More details on how the shift in optical output frequency is brought about will be given later in this text.

Figure 4:
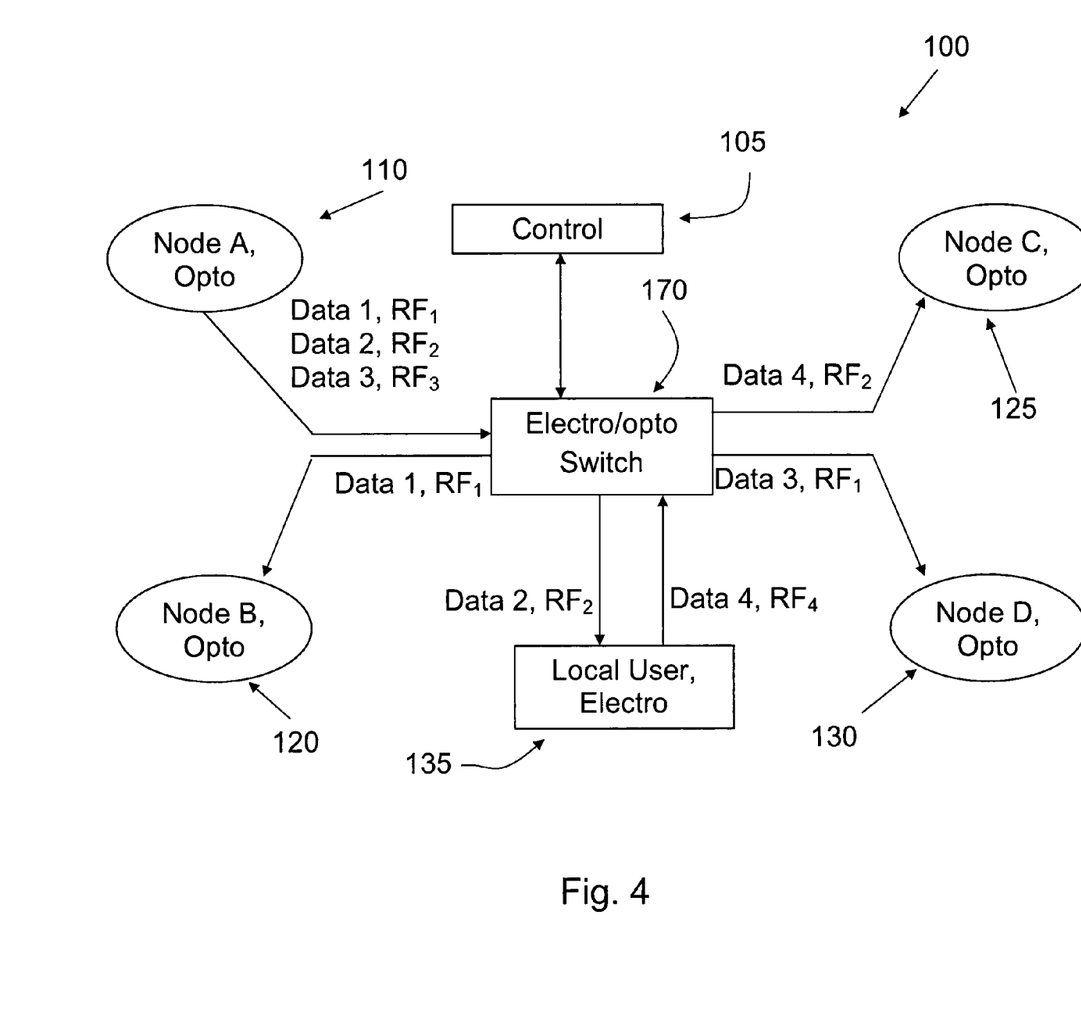

FIG. 4 shows a further embodiment of the electro-optical switch 170: This embodiment is similar to that shown in FIG. 3, but here the electro-optical switch 170 also comprises the possibility of being connected to nodes or users which communicate with the electro-optical switch 170 by means of electrical signaling, as opposed to optical signaling. Such users are here referred to as "local users", and one such user is shown as 135 in FIG. 4. In this embodiment, as indicated in FIG. 4, the electro-optical switch 170 is arranged to also receive data streams as electrical signals from one or more local users such as the local user 135, as well as to transmit data streams as electrical signals to such local users.

In brief, in the embodiment shown in FIG. 4, data streams can be inserted from or "dropped" to local users such as the local user 135. This is indicated in FIG. 4, where the electro-optical switch 170 is shown as receiving and transmitting data streams with signal centre frequencies as follows:

| Data Stream | From Node | To Node | Freq. In | Freq. Out |
|---|---|---|---|---|
| Data 1 | Node A | Node B | $RF_1$ | $RF_1$ |
| Data 2 | Node A | Local | $RF_2$ | $RF_2$ |
| Data 3 | Node A | Node D | $RF_3$ | $RF_1$ |
| Data 4 | Local | Node C | $RF_4$ | $RF_2$ |

Thus, as can be seen from the table above, data stream Data 2 is received optically from Node A and then "dropped" to the local user 135, to which it is transmitted as an electrical signal with the same signal centre frequency $RF_2$ as it has on the optical link from Node A. Data stream Data 4 is inserted into the system by the local user 135, as an electrical signal with signal centre frequency $RF_4$, and is then transmitted to Node C as an optical signal with the optical centre frequency being defined by $RF_2$. In addition, the data stream Data 3 is transmitted to its destination node, Node D, but shifted in optical output frequency, to $RF_1$. The shifts in the optical output frequency from the input optical frequency are controlled by the control unit 105, and are performed in the electro-optical switch 170 while the data streams are electrical signals. In other words, a move in optical output frequency is accomplished by shifting the data stream's signal centre frequency.

It should be mentioned that in an alternative embodiment, data streams to or from local users such as the one 135 can be transmitted or received as baseband signals, so that the signal is demodulated or modulated from/to RF level in the network unit 570.

Figure 5:
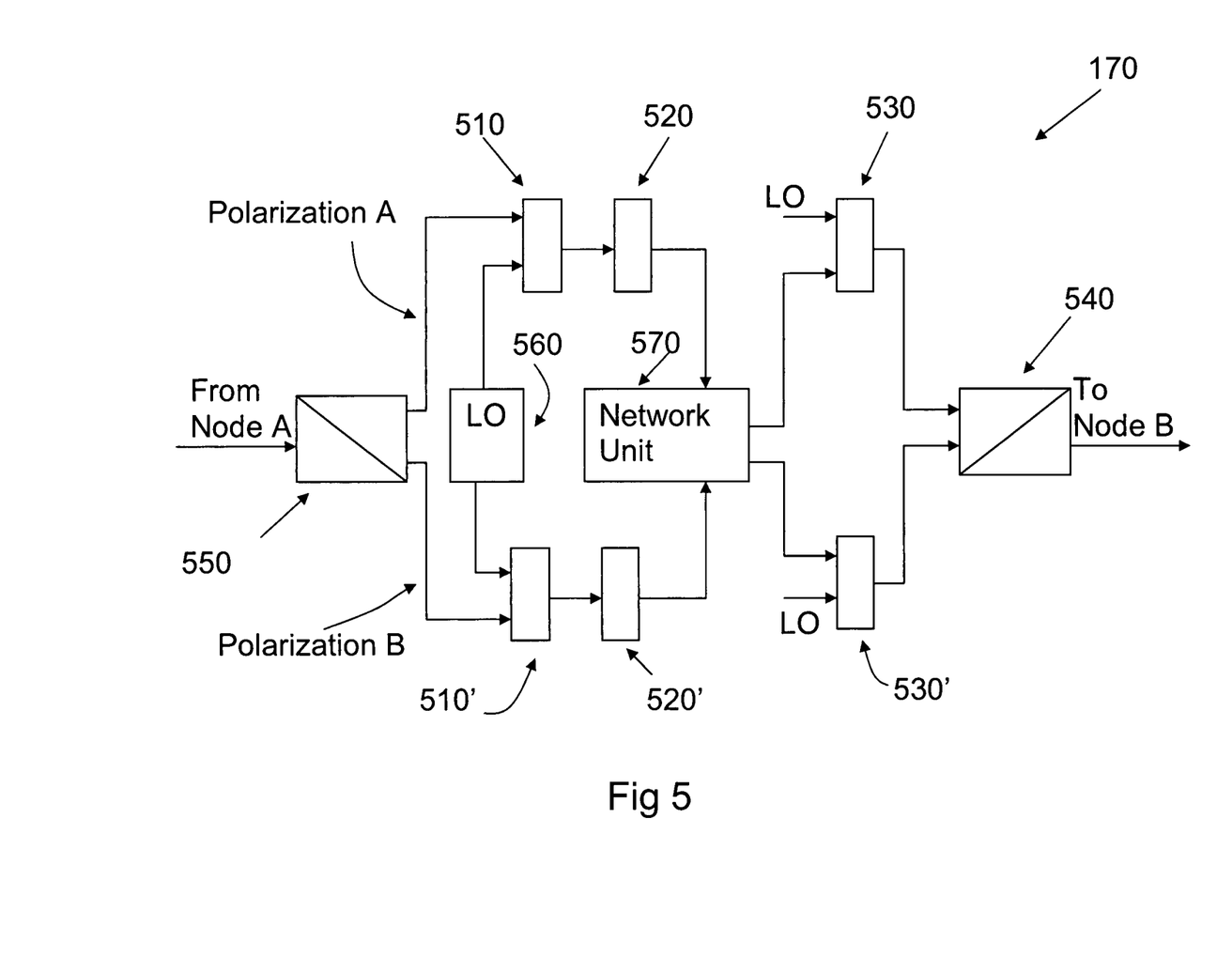
FIG. 5 shows a block diagram of an embodiment of the invention.

FIG. 5 shows a more detailed block diagram of an embodiment of an electro-optical switch 170. The control unit 105 which is shown in some of the other drawings is not shown here, although the embodiment 170 also has its operation controlled by the control unit 105. In addition, for simplicity, the embodiment shown in FIG. 5 is only shown as receiving optical data from one node, "Node A", and transmitting optical data to one other node, "Node B". However, using the principles which will be described below, an electro-optical switch can be designed to handle more or less arbitrary numbers of transmitting optical nodes such as Node A, and receiving optical nodes such as Node B.

The node 170 of FIG. 5 comprises an optical polarization "de-multiplexer" 550, which serves to split an incoming optical signal from an optical transmitter, in this case Node A, into two optical signals, each of which consists of one of two orthogonal polarizations comprised in the incoming optical signal, and each of which comprises two information channels or data streams.

The two output signals from the optical polarization de-multiplexer 550 are shown as Polarization A and Polarization B in FIG. 5. Since the two signals are treated similarly in the electro-optical switch 170, only the processing of Polarization A will be described here. Similarly, components in FIG. 5 which process Polarization B have been given reference numerals which correspond to the component which performs the corresponding process of the Polarization A signal, but the "Polarization B component" has a "prime" attached, e.g. 510-510'.

The output signal from the optical de-multiplexer 550 is used as one of two input signals to an optical coupler 510, the other input to the optical coupler 510 being a signal from an optical Local Oscillator laser, LO 560. The optical coupler 510 produces an output signal (in actuality, it produces two equal outputs, only one of which is shown symbolically) which comprises the sum of the two input signals, i.e. the LO signal and the Polarization A signal.

The output signal from the optical coupler 510 is fed to a photo detector 520, which converts the input optical signal to an output electrical signal. The data stream which is received optically from Node A has now been converted to an electrical signal. In more detail, the electrical output signal from the photo detector is proportional to $(F_{LO}+(F_O+RF_A))^2$ where $F_{LO}$ is the frequency of the LO 560 and $F_O+RF_A$ is the optical frequency of the Polarization A signal. From this, an electrical signal at frequency $RF_A$ can be retrieved.

This electrical signal can now be, for example, shifted in frequency before it is re-converted into an optical output signal. The electrical signal, i.e. the output signal from the photo detector 520, is fed to a networking unit 570, which is the unit that receives instructions from a (not shown) control unit. The instructions from the control unit comprise instructions regarding, for example, shifts in frequency. In addition, although not explicitly shown in FIG. 5, it is suitably to the networking unit 570 that local users such as the one shown in FIG. 4 as 135 are connected. Thus, insertion of new electrical data streams take place in the networking unit, as well as "dropping" of electrical data streams to local users.

The manner in which a shift in electrical frequency of a signal is performed in the networking unit 570 will not be described in detail here, since it is not the focus of the invention, and since those skilled in the art will know that there are many ways of reaching this effect, such as, for example, using mixers, or down shifting the signal to baseband level and then up-converting it to a new desired RF frequency.

After the processing in the networking unit, the signal is input to a modulator 530, where it is used as one of two input signals, the other input signal being an optical signal, suitably from a laser. The modulator 530 uses the two input signals to create an output optical signal bearing the data of the electrical signal but at a desired optical frequency which is decided by the frequency of the laser source. The frequency of the optical signal can be the same as that of the LO 560, or another (not shown) laser source can be used, at another frequency. The output frequency of the modulator 530 will be $RF_A+F_{O(OUT)}$, where $RF_A$ is the signal centre frequency used for the Polarization A signal and $F_{O(OUT)}$ is the frequency of the laser source used. Suitably, $F_{O(OUT)}$ will be the same as $F_O$, but can also be different.

Finally, the output signal from the modulator 530 is now used as input to a polarization multiplexer 540, which also receives the corresponding optical signal from the "Polarization B chain". The polarization multiplexer 540 produces one composite optical output signal, which has two orthogonal polarizations, one of which corresponds to the Polarization A signals, with the other polarization corresponding to the Polarization B signals.

The optical de-multiplexer together with the couplers 510, 510', and the photo detectors 520, 520', can also be seen as an optical-to-electrical field converter which is adapted to receive an optical input signal—the signal from Node A—which has a bandwidth B and to output first and second electrical signals, Polarization A and B, which correspond to respective first and second polarizations in the optical input signal, where each of the first and second electrical signals carries N data channels at respective signal centre frequencies $f_{1-N}$, in this example $RF_A$.

The networking unit 570 can also be seen as being adapted to receive as input signals the first and second electrical signals from the optical-to-electrical field converter mentioned above.

Seen this way, the electro-optical switch 170 also comprising an electrical-to-optical transmitter consisting of the modulators 530, 530', and the polarization multiplexer 540, the transmitter being adapted to receive a first and a second electrical output signal from the networking unit 570, and further being adapted to combine the two electrical signals into one optical output signal with a first and a second polarization, each of which polarization corresponds to one of said electrical signals.

The invention is not limited to the examples of embodiments described above and shown in the drawings, but may be freely varied within the scope of the appended claims.

The invention claimed is:

1. An electro-optical switch, comprising:
a memory;
a processor coupled to the memory, wherein the processor is configured to:
(i) receive N data streams on an optical link from a first node in a communications system, each of said N data streams having an amplitude and a phase and each being located at an optical centre frequency $F_{O1}+RF_M$, where $F_{O1}$ is a first optical modulation frequency and $RF_M$ is a signal centre frequency, where M is an integer which ranges from 1 to N for the N data streams;
(ii) convert at least a first of the N data streams on said optical link to a first electrical data signal at the data stream's signal centre frequency $RF_M$, the first electrical data signal having the amplitude and phase of the first data stream on the optical link;
(iii) convert the first electrical data signal to a first optical output signal at an optical centre frequency $F_{O2}+RF_{out}$ with the amplitude and phase of the first electrical data signal maintained, where $F_{O2}$ is a second optical modulation frequency; and
(iv) forward the first optical output signal to a second node in the communications system, with $RF_M$ and $RF_{OUT}$ being equal to or different from each other, and $F_{O1}$ and $F_{O2}$ also being equal to or different from each other.

2. The electro-optical switch of claim 1, comprising a control unit configured to check which optical frequencies are available for transmissions to the second node, and to cause the switching node to choose $RF_{OUT}$ to be equal to one of those available frequencies.

3. The electro-optical switch of claim 1, further configured to transmit data signals to local users, so that one or more of the N data streams which are converted to electrical data signals can be transmitted to a local user.

4. The electro-optical switch of claim 1, further configured to receive a data signal from a local user, and to convert such a data signal to an optical output signal at a centre frequency $RF_{out}$ with the amplitude and phase of the electrical data signal maintained, and to forward the optical output signal to the second node in the communications system.

5. The electro-optical switch of claim 3, further configured to transmit/receive said data signals to/from a local user as a baseband signal.

6. The electro-optical switch of claim 3, further configured to transmit/receive said data signals to/from a local user as an electrical signal on a Radio Frequency, with an amplitude and a phase.

7. The electro-optical switch of claim 1, comprising at least one optical-to-electrical field converter adapted to receive an optical input signal which has a bandwidth B and to output first and second electrical signals which correspond to respective first and second polarizations in the optical input signal, where each of the first and second electrical signals carries N data channels at respective signal centre frequencies $f_{1-N}$, the electro-optical switch also comprising a networking unit adapted for receiving as input signals the first and second electrical signals from the optical-to-electrical field converter, the electro-optical switch also comprising at least one electrical-to-optical transmitter adapted to receive a first and a second electrical output signal from the networking unit, and further being adapted to combine the two electrical signals into one optical output signal with a first and a second polarization, each of which polarization corresponds to one of said electrical signals.

8. The electro-optical switch of claim 2, wherein the control unit is further configured to control the networking unit to remove, or to replace with another data channel, one or more of said N data channels in each of the two electrical input signals, and to output two electrical signals which each carries an amount of data channels which is equal or greater or smaller than N and centre frequencies which are different or equal to $f_{1-N}$.

9. The electro-optical switch of claim 1, comprising at least one optical-to-electrical field converter adapted to receive an optical input signal which has a bandwidth B and to output first and second electrical signals which correspond to respective first and second polarizations in the optical input signal.

10. The electro-optical switch of claim 1, comprising a control unit configured to control the networking unit to remove, or to replace with another data channel, one or more of said N data channels in each of the two electrical input signals.

* * * * *

UNITED STATES PATENT AND TRADEMARK OFFICE
CERTIFICATE OF CORRECTION

| | |
|---|---|
| PATENT NO. | : 9,106,982 B2 |
| APPLICATION NO. | : 13/818631 |
| DATED | : August 11, 2015 |
| INVENTOR(S) | : Olsson |

Page 1 of 1

It is certified that error appears in the above-identified patent and that said Letters Patent is hereby corrected as shown below:

On the Title Page, in item (75), under "Inventor", in Column 1, Line 1, delete "Hovas" and insert -- Hovås --, therefor.

On the Title Page, in item (57), under "ABSTRACT", in Column 2, Line 14, delete "$RF_{Out}$," and insert -- $RF_{Out}$ --, therefor.

In the Specification

In Column 1, Line 6, delete "§371" and insert -- § 371 --, therefor.

In Column 2, Line 6, delete "$F_{O1}+RF_m$, where $Fo_1$" and insert -- $F_{O1}+RF_M$, where $F_{O1}$ --, therefor.

Signed and Sealed this
Twenty-sixth Day of April, 2016

Michelle K. Lee
*Director of the United States Patent and Trademark Office*